United States Patent
Ozaki et al.

(10) Patent No.: US 9,176,271 B2
(45) Date of Patent: Nov. 3, 2015

(54) LIGHT GUIDE PLATE AND METHOD FOR MANUFACTURING LIGHT GUIDE PLATE

(75) Inventors: Kazuyuki Ozaki, Tokyo (JP); Yasushi Katsuta, Fujisawa (JP); Takashi Iwaki, Fujisawa (JP); Hayato Takada, Kitaibaraki (JP)

(73) Assignee: NIPPON MEKTRON, LTD., Tokyo (JP)

( * ) Notice: Subject to any disclaimer, the term of this patent is extended or adjusted under 35 U.S.C. 154(b) by 743 days.

(21) Appl. No.: 12/999,929

(22) PCT Filed: Mar. 31, 2009

(86) PCT No.: PCT/JP2009/056665
§ 371 (c)(1),
(2), (4) Date: Dec. 17, 2010

(87) PCT Pub. No.: WO2009/157243
PCT Pub. Date: Dec. 30, 2009

(65) Prior Publication Data
US 2011/0103095 A1    May 5, 2011

(30) Foreign Application Priority Data
Jun. 26, 2008  (JP) ................ 2008-167459

(51) Int. Cl.
*F21V 7/04*  (2006.01)
*F21V 5/00*  (2015.01)
*F21V 8/00*  (2006.01)

(52) U.S. Cl.
CPC ............ *G02B 6/0038* (2013.01); *G02B 6/0041* (2013.01); *G02B 6/0043* (2013.01); *G02B 6/0053* (2013.01); *G02B 6/0065* (2013.01)

(58) Field of Classification Search
USPC .................. 362/629, 582, 615, 551
See application file for complete search history.

(56) References Cited

U.S. PATENT DOCUMENTS 4,101,529 A *  7/1978  Ammons ................. 528/67
6,765,040 B2 *  7/2004  Krishnan et al. ........ 523/160
(Continued)

FOREIGN PATENT DOCUMENTS

CN  101113810 A  1/2008
CN  101148129     3/2008
(Continued)

OTHER PUBLICATIONS

Notice of Reasons for Rejection for Japanese Patent Application No. 2010-517804, dated Jun. 26, 2012, and English translation thereof.
(Continued)

*Primary Examiner* — Jong-Suk (James) Lee
*Assistant Examiner* — Bryon T Gyllstrom
(74) *Attorney, Agent, or Firm* — Harness, Dickey & Pierce, P.L.C.

(57) ABSTRACT

A light guide plate that uses a resin film as a material for the light guide plate, that has a reflecting or scattering pattern formed by printing, and that guides a light propagating in the film to exit and emerge from the front surface thereof. The light guide plate is thinner and highly flexible, and has high reliability and durability. A base material of the light guide plate is formed from a thermosetting polyurethane sheet with a thickness of 0.4 mm or less. When a dot pattern is formed by ink-jetting, a white UV curable ink, for which the thermosetting polyurethane exhibits a swellability such that the thermosetting polyurethane increases by 10% or more in weight as a result of being soaked in the ink for one hour at a room temperature, is used as the ink.

3 Claims, 3 Drawing Sheets

(56) References Cited

U.S. PATENT DOCUMENTS

| | | | |
|---|---|---|---|
| 7,070,255 B2* | 7/2006 | Nakajima | 347/29 |
| 7,321,464 B2* | 1/2008 | Ouderkirk et al. | 359/489.06 |
| 7,712,910 B2* | 5/2010 | Ng et al. | 362/85 |
| 2005/0153078 A1* | 7/2005 | Bentley et al. | 427/443.1 |
| 2005/0190575 A1* | 9/2005 | Hayakawa | 362/615 |
| 2006/0209118 A1* | 9/2006 | Nakajima | 347/22 |
| 2008/0019117 A1* | 1/2008 | Ng et al. | 362/85 |
| 2008/0037261 A1* | 2/2008 | Chari et al. | 362/326 |
| 2008/0089088 A1* | 4/2008 | Joseph | 362/573 |
| 2009/0067196 A1* | 3/2009 | Takada et al. | 362/624 |
| 2010/0202143 A1* | 8/2010 | Ruehlemann et al. | 362/249.01 |
| 2010/0240840 A1 | 9/2010 | Toyama et al. | |

FOREIGN PATENT DOCUMENTS

| | | |
|---|---|---|
| JP | 2001297616 A | 10/2001 |
| JP | 2002-214407 A | 7/2002 |
| JP | 2002356055 A | 12/2002 |
| JP | 2003528426 A | 9/2003 |
| JP | 2004083871 A | 3/2004 |
| JP | 2005-249882 A | 9/2005 |
| JP | 2008-27609 A | 2/2008 |
| TW | 200804439 A | 1/2008 |
| WO | 2007020966 A1 | 2/2007 |
| WO | 2008010593 A1 | 1/2008 |

OTHER PUBLICATIONS

Chinese Office Action for Chinese Patent Application No. 200980123851.2, dated Aug. 22, 2012, and English translation thereof.

Chinese Office Action and English translation thereof for corresponding Chinese App. No. 200980123851.2.

* cited by examiner

LIGHT GUIDE PLATE AND METHOD FOR MANUFACTURING LIGHT GUIDE PLATE

FIELD

The present disclosure relates to a light guide plate for guiding a light that has entered into the light guide plate to propagate therein and exit from a predetermined emission surface thereof, and relates to a manufacturing method therefor.

BACKGROUND

This section provides background information related to the present disclosure which is not necessarily prior art.

Portable devices such as mobile phones and mobile computers may incorporate light guide plates for ten-key illumination, displays, and various types of indicators. These portable devices may be required to be thinner and to be more complicated in shape. The light guide plates may similarly be required to be flexible corresponding to portable devices which are made thinner and complicated in shape.

As a conventional light guide plate, molding of hard acrylic resin or polycarbonate has generally been used. Additionally, in order that light that has entered from a side surface of a light guide plate exits from the front surface of the plate, a minute concave and convex pattern has generally been made on the front surface when molded. FIG. 3 shows an example of the configuration of a conventional light guide plate and peripheral members of the plate. FIG. 3(A) shows the light guide plate and the peripheral members as viewed from a side surface parallel to the entering light. FIG. 3(B) shows the convention light guide plate and peripheral members of the plate viewed from a side perpendicular to the entering light. As shown in FIG. 3, formed on the rear surface of the conventional light guide plate 21 is a rear surface emission prism 21a. Additionally, formed on the front surface of the light guide plate 21 is a front surface emission prism 21b.

When light from an LED module 25 enters into the side surface of the light guide plate 21, as shown in FIG. 3(A), a part of the light that has entered into the light guide plate 21 is reflected internally by the rear surface emission prism 21a, refracted by the front surface emission prism 21b of the light guide plate 21, and then exits toward a prism sheet 24. In addition, light that has exited toward the rear surface of the light guide plate 21 from the rear surface emission prism 21b is reflected by a reflecting sheet 27 and enters into the light guide plate 21 again, and finally exits toward the prism sheet 24. The direction of light that has exited toward the prism sheet 24 from the light guide plate 21 is adjusted by prisms of the prism sheet 24 and exits from the opposite surface of the prism sheet 24. Such a conventional light guide plate is formed by molding, and thus has a limit in reduction of thickness. Furthermore, when such a conventional light guide plate of a material such as hard acrylic resin or polycarbonate is made thinner, the light guide plate does not have enough mechanical strength and thus is easily damaged disadvantageously.

To address this, a polycarbonate film or a PET film has been used as the material for a thinner light guide plate. When a resin film is used as the material for the light guide plate, however, it is difficult to form a concave and convex pattern by molding. Therefore, a reflecting or scattering pattern is formed on the rear surface of the light guide plate by means of printing or coating, whereby light propagating within the light guide plate exits from the front surface of the light guide plate.

Generally, such a reflecting or scattering pattern is formed by spraying a coating material containing a pigment over the rear surface of the light guide plate, or printing the pattern by screen-printing. However, such a method requires the formation of a mask in advance, leading to high consumption of cost and time disadvantageously. The spraying method is inconvenient because it is difficult to make the thickness of the pattern evenly and hence leading to poor reproducibility of the pattern. The screen-printing method is also inconvenient because it is difficult to form a thin film and hence to control the thickness of the film and its shape in cross-section.

Besides the foregoing techniques, there has been an attempt to form a dot pattern by printing resin into a lens shape by ink-jetting (see, for example, Patent Document 1). It is supposed that a dot pattern can be formed in a mirror hemispherical shape due to the surface tension of the resin with this technique.

However, with the techniques of applying/printing ink or resin to/on the base material of a film-like light guide plate to form a pattern, the ink or resin once cured has no flexibility. This leads to a risk of damaging or peeling of an ink or resin layer when the film-like base material deforms. Therefore, it has been difficult to form a pattern on a flexible elastomer film.

Patent Document 1: Japanese Patent Application Laid-Open No. 2005-249882

SUMMARY

It is an object of the present disclosure to provide a light guide plate that is thin and highly flexible, yet highly reliable and durable.

A light guide plate of the present disclosure may be made of, in particular, a highly flexible material. In addition, when a pattern is formed onto the base material by ink-jetting, an ink for which a highly flexible material exhibits a swellability of a predetermined value or more corresponding to the desired level of flexibility may be used, whilst a combination of materials that do not dissolve in each other is generally selected in order to prevent the ink from running.

A light guide plate for guiding a light that has entered into the light guide plate to propagate therein and exit from a predetermined emission surface thereof. The light guide plate is characterized in that the light guide plate is formed by printing a dot pattern of white ink on a surface of a flat base material made of elastomer by ink-jetting. The surface is opposite to the emission surface. The base material is made of elastomer of predetermined high flexibility and exhibits, for the white ink, a swellability of a predetermined value or more corresponding to the type of the base material.

The predetermined high flexibility refers to flexibility determined to meet the intended application of the light guide plate. The swellability of the predetermined value corresponding to the type of the base plate refers to a swellability that results in such strong bonding of the base material with the white ink that the dot pattern is not damaged and does not peel when properties of the light guide plate, including flexibility, are exhibited. By designing approach or an experimental approach, the predetermined high flexibility is determined according to the intended application of the light guide plate and the swellability of the predetermined value is determined according to the type of base material selected to meet the intended use of the light guide plate.

With this configuration, using the white ink for which the base material exhibits the swellability corresponding to its type, the dot pattern is printed on a base material of highly flexible elastomer, thereby forming a light guide plate. This makes it possible to obtain a light guide plate that is thinner and highly flexible, is less liable to damaging or peeling of the dot pattern during deformation of the base material, and yet has high reliability and durability.

In the light guide plate according to the present disclosure, the base material may have a shore-A hardness of 60 to 98, inclusive. This makes it possible to obtain sufficient flexibility for a light guide plate used in complicatedly deformed shape or subject to repeated deformations. Accordingly, the light guide plate can be disposed in a mobile device whose inside has a complex or movable shape.

In the light guide plate according to the present disclosure, the base material may have a thickness of 0.4 mm or less. This makes it possible to form a light guide plate that can be incorporated in a thinner mobile device securely.

In the light guide plate according to the present disclosure, the elastomer of high flexibility may be polyurethane, acrylic rubber, or the like. In particular, polyurethane is flexible so as to allow the light guide plate to be deformed to any complicated shape. This makes it possible to form a light guide plate that can be incorporated in a thinner mobile device more securely and that is durable enough for repeated deformations due to key operation of a portable device. Selecting polyurethane as a base material makes it possible to form a light guide plate having sufficient transparency and thus having sufficient optical performance. Incidentally, polyurethane is categorized as either a thermosetting polyurethane or a thermoplastic polyurethane depending on processing method. Thermoplastic polyurethane is less oil resistant because, taking moldability into account, various materials are added thereto. In addition, thermoplastic polyurethane is easily contracted or deformed by heat, and thus difficult to be used if heat resistance is required. Therefore, thermosetting polyurethane is preferable to thermoplastic polyurethane as the base material in the present invention.

In the light guide plate according to the present disclosure, the swellability of the predetermined value or more is a swellability that allows the base material to increase in weight by 10% or more as a result of being soaked in the white ink for one hour.

If the swellability of the base material for the white ink satisfies this condition where the type of base material is polyurethane, flexibility capable of coping with the key operations in an ordinary portable device can be ensured, and adhesion between the base material and white ink and their bonding strength can be enhanced to a sufficient level. This ensures the flexibility and durability sufficient for a light guide plate to be used for a ten-key of a mobile phone, for example.

In addition, the present disclosure may provide a manufacturing method for a light guide plate. The method includes applying UV curable white ink in dot shape by ink-jetting onto a flat base material made of elastomer of predetermined high flexibility. The method also includes curing the white ink by irradiating UV light to the white ink immediately after the white ink is applied. The method is also characterized in that the white ink is an ink for which the base material exhibits a swellability of a predetermined value or more corresponding to the type of the base material.

In this case, the predetermined high flexibility refers to flexibility determined to meet the intended application of the light guide plate. The swellability of the predetermined value corresponding to the type of the base plate refers to a swellability that results in such strong bonding of the base material with the white ink that the dot pattern is not damaged and does not peel when properties of the light guide plate, including flexibility, are exhibited. By using a method involving a designing approach or an experimental approach, the predetermined high flexibility is determined according to the intended application of the light guide plate, and the swellability of predetermined value is determined according to the type of base material selected to meet the intended use of the light guide plate.

According to this manufacturing method, it is possible to manufacture a light guide plate in which a dot pattern is printed on a base material of highly flexible elastomer by using the white ink for which the base material exhibits the swellability corresponding to its type. This makes it possible to obtain a light guide plate that is thinner and highly flexible, is less liable to damaging or peeling of the dot pattern during deformation of the base material, and yet has high reliability and durability.

In the manufacturing method for the light guide plate according to the present disclosure, the highly flexible elastomer may be polyurethane. The swellability of the predetermined value or more may be a swellability that allows the base material to increase in weight by 10% or more as a result of being soaked in the white ink for one hour.

As far as possible, the means described above may also be used in combination.

DRAWINGS

DETAILED DESCRIPTION

A light guide plate according to an embodiment of the present disclosure will hereinafter be described with reference to the drawings.

Figure 1:
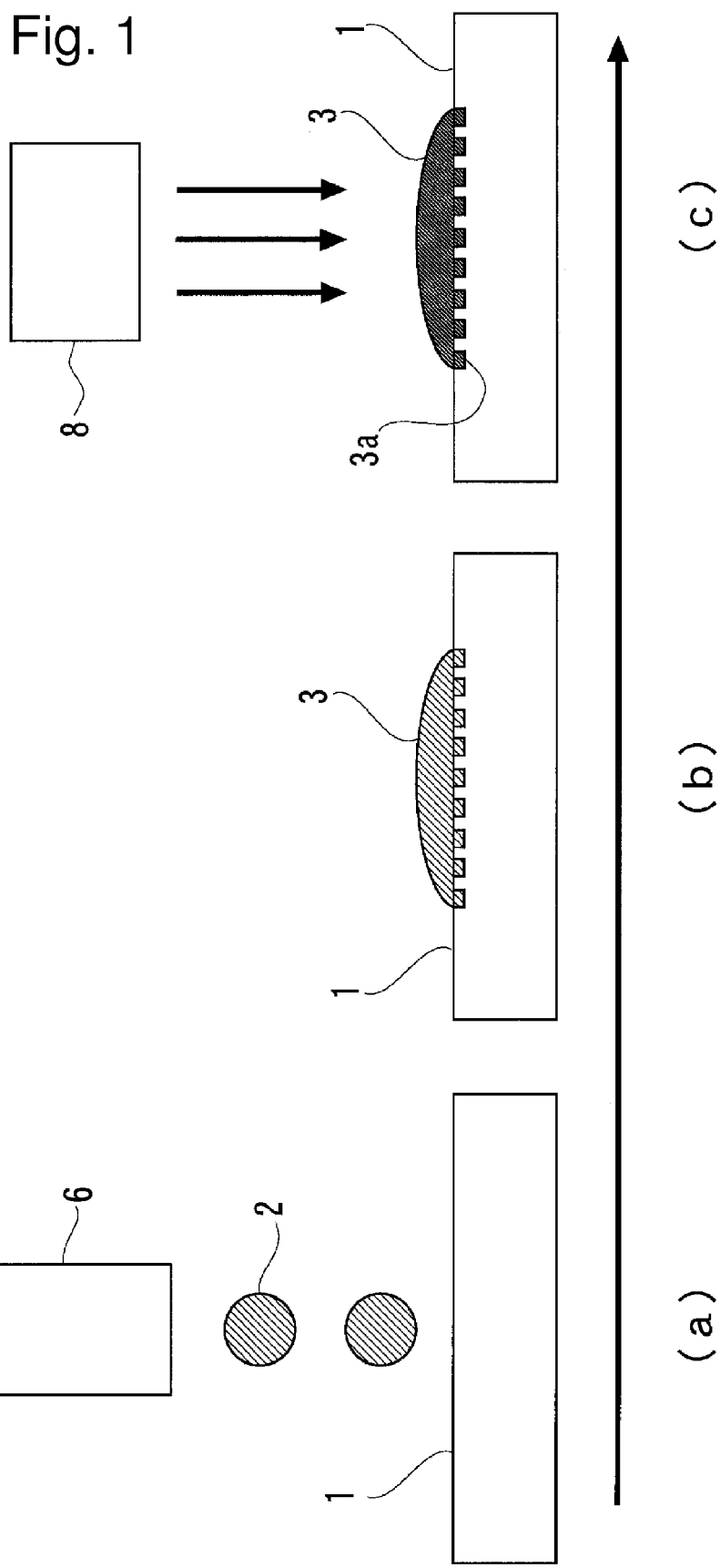
FIGS. 1A-1C are views for illustrating a manufacturing process for a light guide plate according to an embodiment of the present disclosure.

FIGS. 1A-1C illustrate a manufacturing process for light guide plates according to the present disclosure. In FIGS. 1A-1C, as a base material 1 for the light guide plate, a thin, flexible material applicable for a light guide plate is selected. Additionally, a composite of a white ink composition, with which the base material 1 shows swellability corresponding to the type of the base material, is selected. Then dot printing with the white ink is carried out by an ink-jet method in which droplets of white ink 2 are jetted from an ink-jet head 6, as shown in FIG. 1A.

As shown in FIG. 1B, the white ink penetrates and disperses in the base plate 1 around the boundary between the base plate 1 and the white ink dot 3 applied to the base plate 1. In this condition, UV light is irradiated onto the white ink 3 by a UV curing device 8, as shown in FIG. 1C, for curing the white ink 3. As a result, the white ink dot 3 itself is cured, and the white ink that has entered into and dispersed in the base plate 1 is also cured, thereby forming a strong bonding portion 3a. Thus, the adhesion and bonding strength between the white ink dot 3 and the base material 1 can be enhanced.

Figure 2:
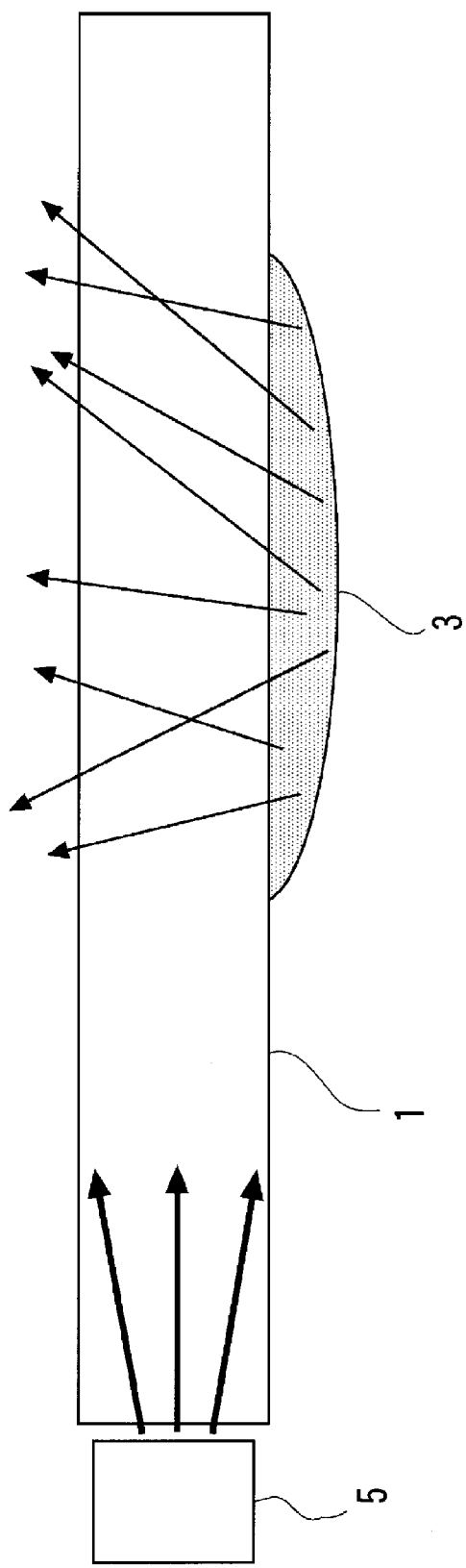
FIG. 2 is a view for illustrating the action of the light guide plate according to the embodiment of the present disclosure.
Figure 3:
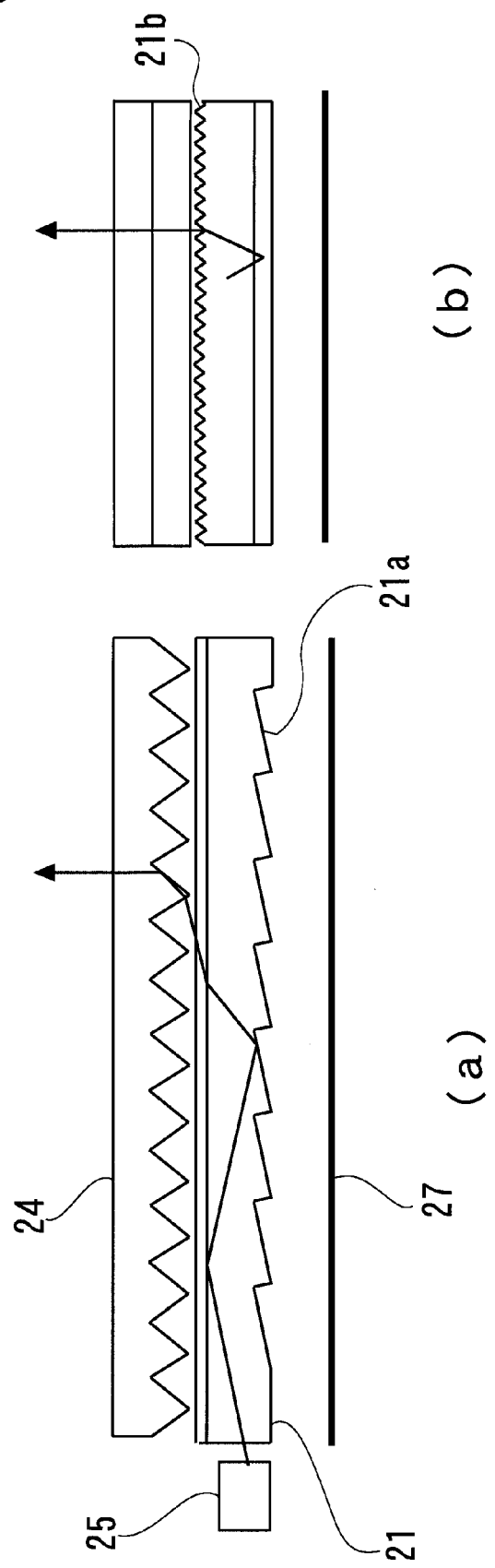
FIG. 3 is a view for illustrating an example of the use of a light guide plate according to a conventional technique.

Next, the action of a light guide plate produced through a method shown in FIGS. 1A-1C will be described briefly with reference to FIG. 2. As shown in FIG. 2, light enters into the base material 1 of the light guide plate from a side surface thereof by an LED module 5. The light that has entered into the base material 1 propagates within the base material 1, and some of the light is going to exit through the rear surface of the base material 1. The light that is going to exit through the rear surface is, however, scattered by the pigment in the white dot 3 or reflected by the boundary surface between the white ink dot 3 and the outside, and thus exits from the front surface side of the base material 1. As a result, light entered from the LED module 5 can exit evenly from the top of the base material 1 by a dot pattern of white ink dots 3.

In the present embodiment, the ink-jet method is used. This makes it possible to precisely adjust the quantity of droplets of white ink 2 and hence to precisely control the diameter and thickness of the white ink dot 3 on the base material 1.

In addition, the ink-jet method is highly flexible as to an image to be formed, and then an image to be formed can be easily changed. Thus, a dot pattern can be formed with high flexibility. In addition, since the time required for forming or changing a pattern can be reduced, time for completion can also be greatly shortened.

In the present embodiment, it is preferable that the thickness of the base material 1 be 0.4 mm or less. This facilitates handling in the process of forming a film as the base material 1, and the process of forming a pattern by ink-jetting, then contributes to the thinning of the light guide.

Further, recent demand for thinning of a back light for mobile phones has particularly become strong. It is, therefore, preferable that the base plate 1 be in the range of 0.05 to 0.25 mm thick, inclusive.

Additionally, as a material for the base material 1, a rubber-like one is preferable. This enables the base material 1 to be easily attached to the surface of a member that has concavities and convexities or to a curved surface, thus easily meeting the need for a light guide plate to be fitted in complex shapes or limited spaces when installed in, for example, a mobile phone. A shore-A hardness of 60 to 98, inclusive, is preferable for the base material 1. This ensures adequate flexibility of a material for the light guide plate, which can be used while deformed in a complex shape or repeatedly deformed. Experiments, etc., have shown that such a light guide plate can be disposed in a mobile device whose inside has a complex or movable shape.

First Example

Next will be described a first example according to the present disclosure. In the present example, a thermosetting polyurethane film with a thickness of 200 μm is used as a base material 1. As for a printing ink, white UV curable ink A (the main constituent: 70 to 90 (inclusive) wt % of photopolymerization composition; a pigment: 10 to 20 (inclusive) wt % of titanium dioxide; and the remainder: 5 wt % or less of polymerization initiator is used. As an ink-jet head 6, a piezo-type is used under conditions of 360 dpi and droplet amount of 14 pl. As a UV curing device, Subzero (manufactured by Integration Inc.) is used.

<Swellability Test>

To compare the bonding strength of the white UV curable ink A and base material 1 according to the present example, with the bonding strength of a combination with each of other base materials, a swellability test was performed for combinations of base materials and the white UV curable ink A. The swellability test was performed by soaking a sample sheet of each base material in the white UV curable ink A for one hour at a room temperature (25° C.) and measuring the weight difference of the sample sheet before and after the soaking. The obtained results are shown in Table 1.

TABLE 1

| Base Material | Ink-Swellability |
| --- | --- |
| polyurethane | High |
| polyimide | Low |
| PET | Low |
| PTFE | Low |
| polycarbonate | Low |
| silicone (rubber) | Medium |
| nylon | Low |
| epoxy | Low |

In the table, "High" in ink-swellability means a weight increase by 10% or more; "Medium" in ink-swellability means a weight increase by 1 to 10% (not inclusive); and "Low" in ink-swellability means a weight increase by 1% or less. It can be seen that among the base materials tested, polyurethane has the highest ink-swellability. This means that the combination of the thermosetting polyurethane film and white UV curable ink A can result in the highest level of penetration and dispersion of the white UV curable ink A into the base material and the highest bonding strength.

<Peeling Durability Test>

As a peeling durability test for the light guide plate formed from the combination of the thermosetting polyurethane film and white UV curable ink A in the present example, a keystroke test was performed in the following conditions: pressing load: 600 g; the shape of the end of a striking point: φ 10 mm and 7.5 R; rubber hardness: 65; and the number of keystrokes: one million. As a result, no peeling of the dot pattern was found. Accordingly, it can be said that this combination of the base material and white ink provides a light guide plate which is durable to deformation due to key operation of a mobile device and that a light guide plate capable of being used practically can be obtained.

On the other hand, the same keystroke test was performed on a light guide plate formed from the combination of silicone (rubber) that showed "medium" ink-swellability in swellability test and white UV curable ink A. A peeling of the dot pattern was found as a result of the keystroke test.

As described above, a thermosetting polyurethane film with a thickness of 200 μm was used as the base material 1 and white UV curable ink A was used as the white ink in the present example. In this combination, the base material 1 was increased in weight by 10% or more as a result of being soaked in the white UV curable ink A for one hour at a room temperature (25° C.). Due to this swellability, the bonding strength of the base material and white ink and the durability sufficient for a light guide plate are attained.

It is known that selecting a thermosetting polyurethane film as the base material 1 ensures optical performance (i.e., transmittance) and flexibility sufficient to illuminate, for example, the key operating section of a mobile device. Additionally, in this example, it was found that the bonding strength of the base material and white ink and the durability sufficient for a light guide plate can be attained as long as the combination of the thermosetting polyurethane film used as the base material 1 and the white ink shows a swellability such that the base material 1 increases in weight by 10% or more as a result of being soaked in the white ink for one hour at a room temperature (25° C.).

Accordingly, the combination of the thermosetting polyurethane film and white UV curable ink A makes it possible to attain optical performance, flexibility, reliability and durability sufficient for the light guide plate used in a mobile device. Further, in the light guide plate according to the present example, a thermosetting polyurethane film with a thickness of 200 μm is used as the base material 1, and thus the light guide plate may be used in thinner mobile device.

As for the silicone rubber, the base material 1 did not increase in weight by 10% or more as a result of being soaked in the white ink for one hour at a room temperature (25° C.) (actually increased by 7 to 8%). In the present example, it can be said that such a swellability is not enough to attain the bonding strength of the base material and white ink and the durability sufficient for a light guide plate.

Second Example

In the present example, white ink different from the one used in the first example was selected and tested in the same way as in the first example. In the present example also, it was found that a combination of this white ink and a thermosetting polyurethane film for use as the base material could attain sufficient bonding strength.

In the present example, printing was performed using the white ink under the conditions described below. A thermosetting polyurethane film with a thickness of 200 μm was used as the base material 1. As the white ink, white UV curable ink B (the main constituent: 65 to 75 (inclusive) wt % of acrylic acid ester; and a pigment: 15 to 25 (inclusive) wt % of titanium dioxide) was used. An ink-jet head 6 and an UV curing device 8 same as those in the first example were used.

For the combination of this base material and the ink, the swellability test and keystroke test were performed in the same manner as in the first example. The same result as that in the first example was obtained.

In the present disclosure, the relations between the types of the base material 1 and the required swellabilities may be researched in advance through experiments and may be represented on a map. With this map, when a base material 1 and white ink are selected and swellability test is performed, it possible to instantaneously determine whether or not a light guide plate of sufficient durability can be formed from this combination. Since the durability required by each light guide plate differs according to its intended application, such a map may be formed for each intended application.

The invention claimed is:

1. A light guide plate for guiding a light which has entered into the light guide plate to propagate therein and exit from a predetermined emission surface thereof, the light guide plate comprising:
   a flat base material; and
   a dot pattern of white ink including an acrylic acid ester directly disposed on and soaked into a surface of the flat base material, the surface being opposite to the emission surface;
   wherein the base material is made of a thermosetting polyurethane as an elastomer of predetermined high flexibility and exhibits a shore-A hardness of 60 to 98, inclusive, and
   for the white ink, a swellability of a predetermined value or more allows the base material to increase in weight by 10% or more as a result of being soaked in the white ink for one hour.

2. A light guide plate according to claim 1, wherein the base material has a thickness of 0.4 mm or less.

3. A manufacturing method for a light guide plate, comprising:
   ink-jetting a UV curable white ink including an acrylic acid ester in dot shape directly onto and soaked into a flat base material made of a thermosetting polyurethane as an elastomer of predetermined high flexibility which has a shore-A hardness of 60 to 98, inclusive; and
   curing the white ink by irradiating UV light to the white ink immediately after the white ink is applied,
   wherein the white ink is an ink for which the base material exhibits a swellability of a predetermined value or more, and allows the base material to increase in weight by 10% or more as a result of being soaked in the white ink for one hour.

* * * * *